United States Patent
Bang et al.

(10) Patent No.: US 6,700,776 B2
(45) Date of Patent: Mar. 2, 2004

(54) COMPUTER

(75) Inventors: Seog Bang, Yongin (KR); Woo-Jung Shim, Suwon (KR)

(73) Assignee: Samsung Electronics Co., Ltd., Suwon (KR)

(*) Notice: Subject to any disclaimer, the term of this patent is extended or adjusted under 35 U.S.C. 154(b) by 59 days.

(21) Appl. No.: 10/136,286

(22) Filed: May 2, 2002

(65) Prior Publication Data

US 2002/0172003 A1 Nov. 21, 2002

(30) Foreign Application Priority Data

May 17, 2001 (KR) ......................................... 2001/27046
Nov. 6, 2001 (KR) ......................................... 2001/68914

(51) Int. Cl.[7] ................................................ G06F 1/16
(52) U.S. Cl. ........................ 361/683; 361/725; 361/724; 361/685; 312/223.1; 312/223.2
(58) Field of Search ................................ 361/724–727, 361/683–687, 801–808; 312/223.1, 223.2, 223.3, 298; 364/708.1; 174/35 R, 35 GC; 70/159–162; 109/67, 68; 220/4.02, 254, 255; 411/182, 549, 553; 292/8, 30

(56) References Cited

U.S. PATENT DOCUMENTS

| | | | | |
|---|---|---|---|---|
| 5,051,868 A | * | 9/1991 | Leverault et al. ............ | 361/683 |
| 5,495,389 A | * | 2/1996 | Dewitt et al. ................ | 361/683 |
| 5,701,231 A | * | 12/1997 | Do et al. ..................... | 361/683 |
| 5,713,641 A | | 2/1998 | Hosoya | |
| 5,774,330 A | | 6/1998 | Melton et al. | |
| 5,774,337 A | * | 6/1998 | Lee et al. .................... | 361/725 |
| 5,781,410 A | | 7/1998 | Keown et al. | |
| 5,784,251 A | | 7/1998 | Miller et al. | |
| 5,995,363 A | * | 11/1999 | Wu ............................ | 361/679 |
| 6,000,767 A | | 12/1999 | Liu et al. | |
| 6,111,754 A | * | 8/2000 | Abbott et al. ............... | 361/724 |
| 6,115,239 A | * | 9/2000 | Kim ........................... | 361/681 |

FOREIGN PATENT DOCUMENTS

| | | |
|---|---|---|
| JP | 10-293625 | 11/1998 |
| KR | 1989-5421 | 4/1989 |
| KR | 1995-9817 | 4/1995 |
| KR | 1996-35207 | 11/1996 |
| KR | 1998-49755 | 10/1998 |
| KR | 1998-67687 | 12/1998 |
| KR | 1999-12569 | 4/1999 |
| KR | 1999-41085 | 12/1999 |
| KR | 2001-35476 | 6/2001 |

* cited by examiner

*Primary Examiner*—Darren Schuberg
*Assistant Examiner*—Michael Datskovsky
(74) *Attorney, Agent, or Firm*—Robert E. Bushnell, Esq.

(57) ABSTRACT

A computer with a fixed casing accommodating at least one computer component and having an upward opening, a movable casing covering at least a part of the opening of the fixed casing and equipped with at least one computer component on its inner surface, a pair of hinges adjacent to opposite sides of the opening and rotatably supporting the movable casing, and a latch provided either the fixed casing or the movable casing, engaging and disengaging the movable casing to and from the fixed casing. With this configuration, the present invention provides the computer having the casing which is simply assembled and disassembled, thereby allowing a user easily repair and to exchange the computer components.

20 Claims, 15 Drawing Sheets

COMPUTER

CLAIM OF PRIORITY

This application makes reference to, incorporates the same herein, and claims all benefits accruing under 35 U.S.C. §119 from an application for COMPUTER earlier filed in the Korean Industrial Property Office on May 17, 2001 and there duly assigned Serial No. 27046/2001 and an application for COMPUTER earlier filed in the Korean Industrial Property Office on Nov. 6, 2001 and there duly assigned Serial. No. 68914/2001 by that Office.

BACKGROUND OF THE INVENTION

1. Field of the Invention

The present invention relates in general to a desktop computer, and more particularly, a desktop computer having a casing which is easily assembled and disassembled.

2. Description of the Related Art

To easily repair or exchange computer components, a casing for a conventional computer includes a front cover on which a power switch is located, a main casing having an opening in its side and accommodating various kind of components, and a panel removably closing the opening in the main cover.

This conventional computer is mostly used on a desk. A user prefers a computer occupying a relatively small space on the desk because the desk has a limited space. Accordingly, to make a computer that occupies a small space, a casing should have such a structure that the hardware is stacked. However, in such a computer, a casing should have a middle frame between a movable casing and a motherboard in order to decrease the occupied space. Further, because the middle frame must be removed by using a tool such as a screwdriver in order to exchange or repair components such as a RAM and a CPU mounted on the motherboard, the procedure of assembling and disassembling becomes complicated.

For the foregoing reasons, there is a need for a computer which is simply assembled and disassembled.

SUMMARY OF THE INVENTION

It is therefore an object of the present invention to provide an improved computer.

It is another object to provide a computer in which hardware is easily assembled and disassembled.

It is also an object to provide a computer that does not require the use of a tool such as a screwdriver for removing a middle frame in order to exchange or repair computer components.

It is further an object to provide a computer using a movable casing that covers the fixed casing and that accommodates computer components.

It is still further an object to provide a computer using a latch that engages and disengages the movable casing to and from the fixed casing.

It is yet further an object to provide a computer that permits access to components on the motherboard only by opening a movable casing.

It is another object to provide a computer having a latch that engages the movable casing to the fixed casing at multiple locations and disengages the movable casing engaged to the fixed casing at the multiple locations from the fixed casing at a time by siding a latch.

The computer having features of the present invention may be constructed with a fixed casing, a movable casing, a pair of hinges rotatably coupling the fixed casing to the movable casing, and a latch.

The fixed casing accommodates various kinds of components and has an opening. The movable casing covers at least part of the opening of the fixed casing and accommodates at least one computer component. The hinges rotatably couple the fixed casing to the movable casing.

The latch engages and disengages the movable casing to and from the fixed casing. The latch includes a slide mounted on the fixed casing. The slide has an offset corresponding to a tab located in the fixed casing. The latch moves laterally so as to engage the tab to the offset where the movable casing covers the opening and to disengage the tab from the offset where the movable casing uncovers the opening. Where the movable casing covers the opening of the fixed casing, the components accommodated in the fixed casing and the movable casing are not accessible for repairing or removing those components. Where the movable casing uncovers said opening, those components are accessible for their repair or removal.

The computer preferably includes at least one elongated hole formed on the slide along a sliding direction and at least one boss protruding from the fixed casing. The boss is inserted into the elongated hole so as to guide the sliding of the slide.

The latch also preferably includes a grip.

The computer preferably includes a catch provided at the fixed casing, and a release lever provided at a free end of the slide. The release lever is caught and released by the catch. One of the catch and the release lever is preferably made of a material which can be elastically deformed against the other.

The computer preferably includes a clasp provided at a position adjacent to the release lever, and pushing the release lever so as to release the release lever from the catch by rotation thereof. Preferably, the clasp has a finger hole.

The computer preferably includes a spring having a first end coupled to the fixed casing and a second end coupled to the slide.

BRIEF DESCRIPTION OF THE DRAWINGS

A more complete appreciation of the invention, and many of the attendant advantages, thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

A preferred embodiment of the present invention will be described in more detail with reference to the accompanying drawings.

Figure 1:
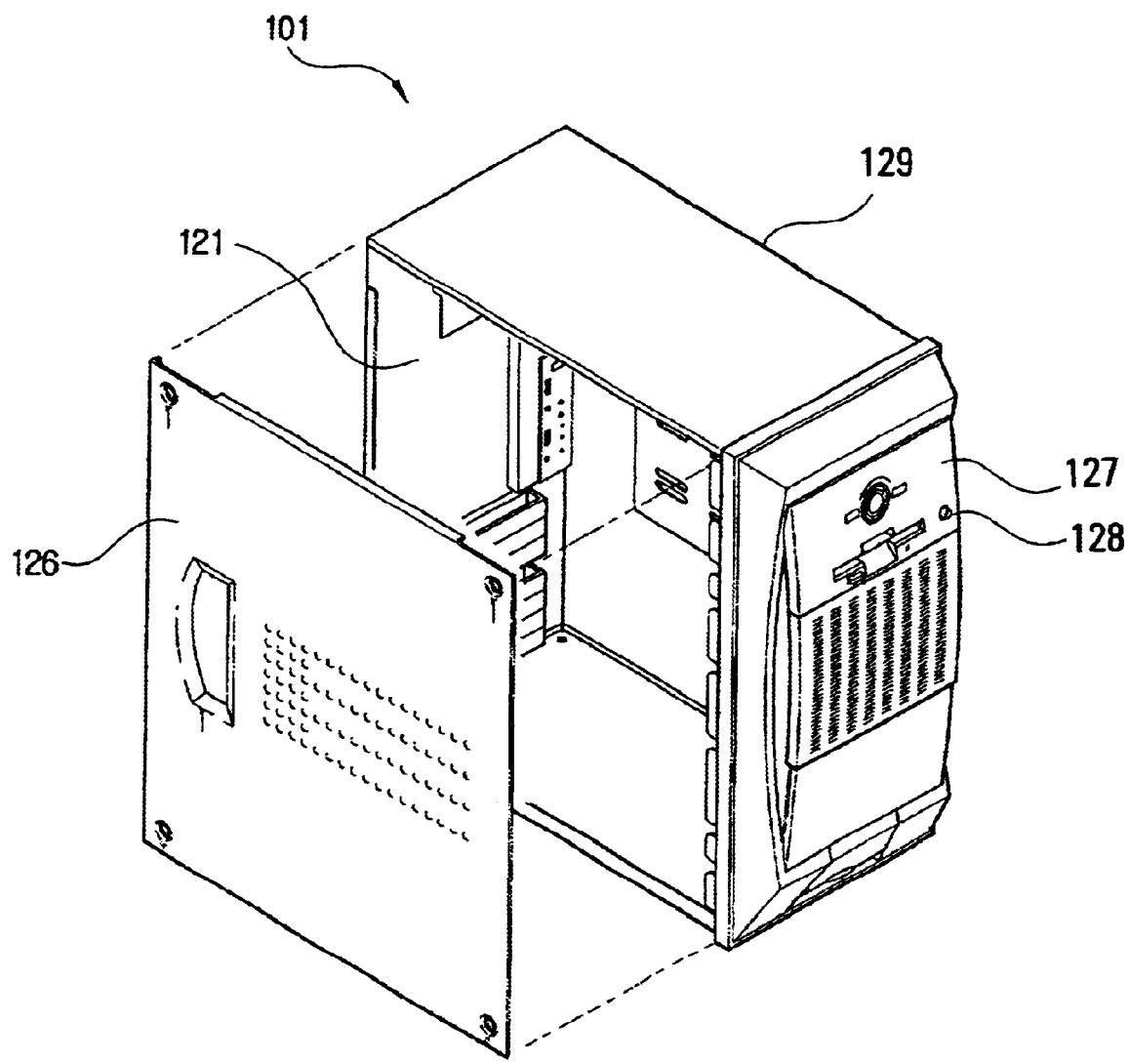
FIG. 1 is an exploded perspective view of a conventional computer.

To easily repair or exchange a computer component, a casing 101 for a conventional computer as shown in FIG. 1 includes a front cover 127 on which a power switch 128 is mounted, a main casing 129 having an opening 121 in its side and accommodating various kinds of components, and a panel 126 removably closing the opening 121 on the side of the main casing 129.

This conventional computer is mostly used on a desk. A user prefers a computer occupying a relatively small space on the desk because the desk has a limited space. Accordingly, to make a computer that occupies a small space, its casing should have such a structure such as that shown in FIG. 2.

A casing 101a includes a floor 110 on which various kinds of components such as a motherboard 115 may be mounted and having a guiding rail 117 formed at both sides of the floor 110, a movable casing 120 covering the floor 110 and having a guiding groove 116 engaging with the guiding rail 117, and a middle frame 123 of a plate shape being installed between the floor 110 and the movable casing 120, on which various kinds of components such as a CD-ROM (compact disk-read only memory) drive 122 are mounted.

To assemble the computer having such a casing, the motherboard 115 is first mounted on the floor 110, and then a central processor unit, a RAM (random access memory), etc., are mounted on the motherboard 115. Thereafter, the middle frame 123 equipped with the CD-ROM drive 122 or other components is coupled to the floor 110, using a fastener 125. Lastly, the movable casing 120 having the guiding groove 116 and the opening 121 through which the CD-ROM drive 122 passes is coupled with the floor 110 by means of screws (not shown). Thus, the computer occupies a relatively small space in comparison with the computer in FIG. 1.

Figure 2:
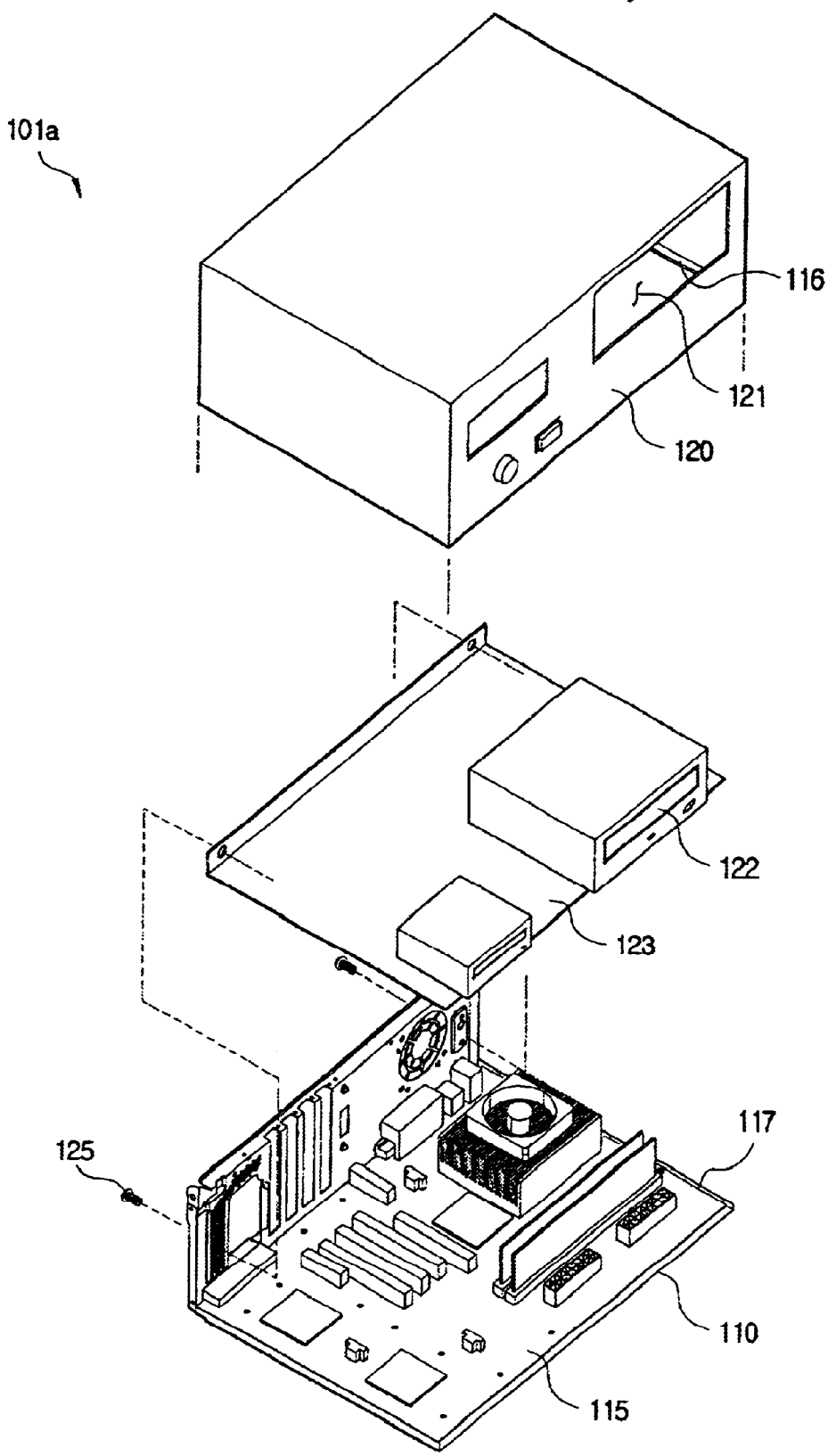
FIG. 2 is an exploded perspective view of another conventional computer.

In such a computer as shown in FIG. 2, the computer should have the middle frame 123 between the movable casing 120 and the floor 110 in order to decrease the occupying space. The procedure of assembling and disassembling becomes complicated because the middle frame 123 must be removed by using a tool such as a screwdriver in order to exchange or repair components such as a RAM and a CPU mounted on the motherboard 115.

Figure 3:
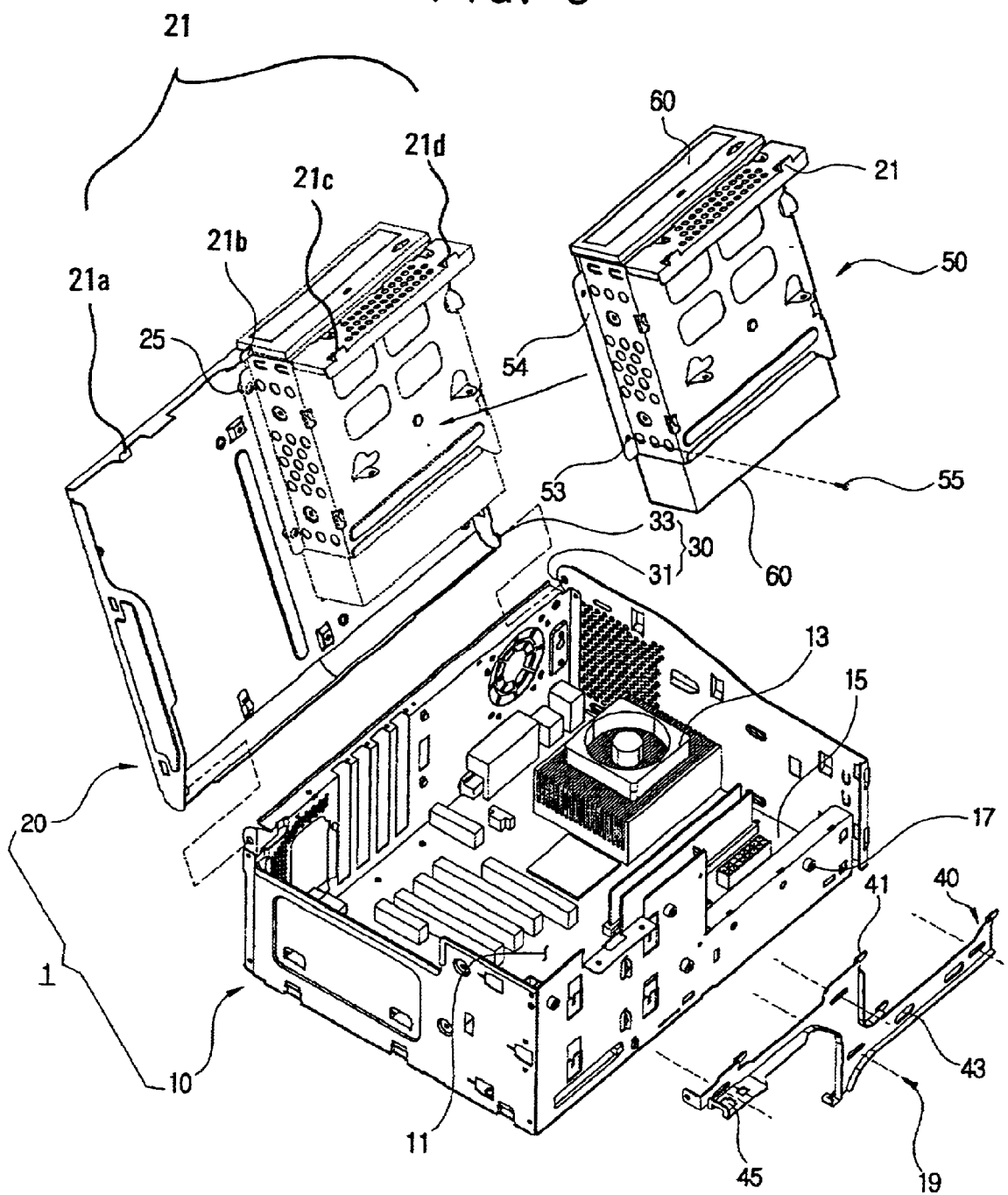
FIG. 3 is an exploded perspective view of a computer constructed according to the principles of the present invention.

FIG. 3 is an exploded perspective view of a computer according to the present invention. As shown in FIG. 3, a casing 1 of the computer according to the present invention includes a fixed casing 10 accommodating various kinds of components and having an upward opening 11, a movable casing 20 covering the opening 11 and equipped with at least one computer component on its inner surface, a pair of hinges 30 mounted near opposite sides of the rear of the opening 11 and rotatably supporting the movable casing 20, a latch including a slide 40 locking and unlocking the fixed casing 10 covered by the movable casing 20.

On the fixed casing 10 is mounted a motherboard 15 equipped with a CPU 13 or a RAM, being mounted through the upward opening 11. A plurality of bosses 17 protrudes from the front of the fixed casing 10, and are combined with the slide 40. At opposite sides of the rear end in which the fixed casing 10 and the movable casing 20 are met each other are formed a pair of hinge holes 31 to be combined with a pair of hinge pins 33 of the movable casing 20. The hinge holes 31 and the hinge pins 33 constitute the hinge 30.

The movable casing 20 has a plurality of tabs 21a, 21b bent forward from the front of the movable casing 20, the hinge pin 33 protruding from the opposite sides of the movable casing 20, and a fastener receiver 25 receiving a fastening screw 55 which fastens a cage 50 to the movable casing 20. The cage 50 accommodates at least one computer component.

A plurality of offsets 41 of the slide 40 is locked and unlocked to the plurality of tabs 21, so that the movable casing 20 covers and uncovers the fixed casing 10.

As shown in FIG. 3, the cage 50 is attached to the inner surface of the movable casing 20 by mounting it on the movable casing 20 and then fastening screws 55 through a screw hole 53 and a fastener receiver 25.

Figure 6:
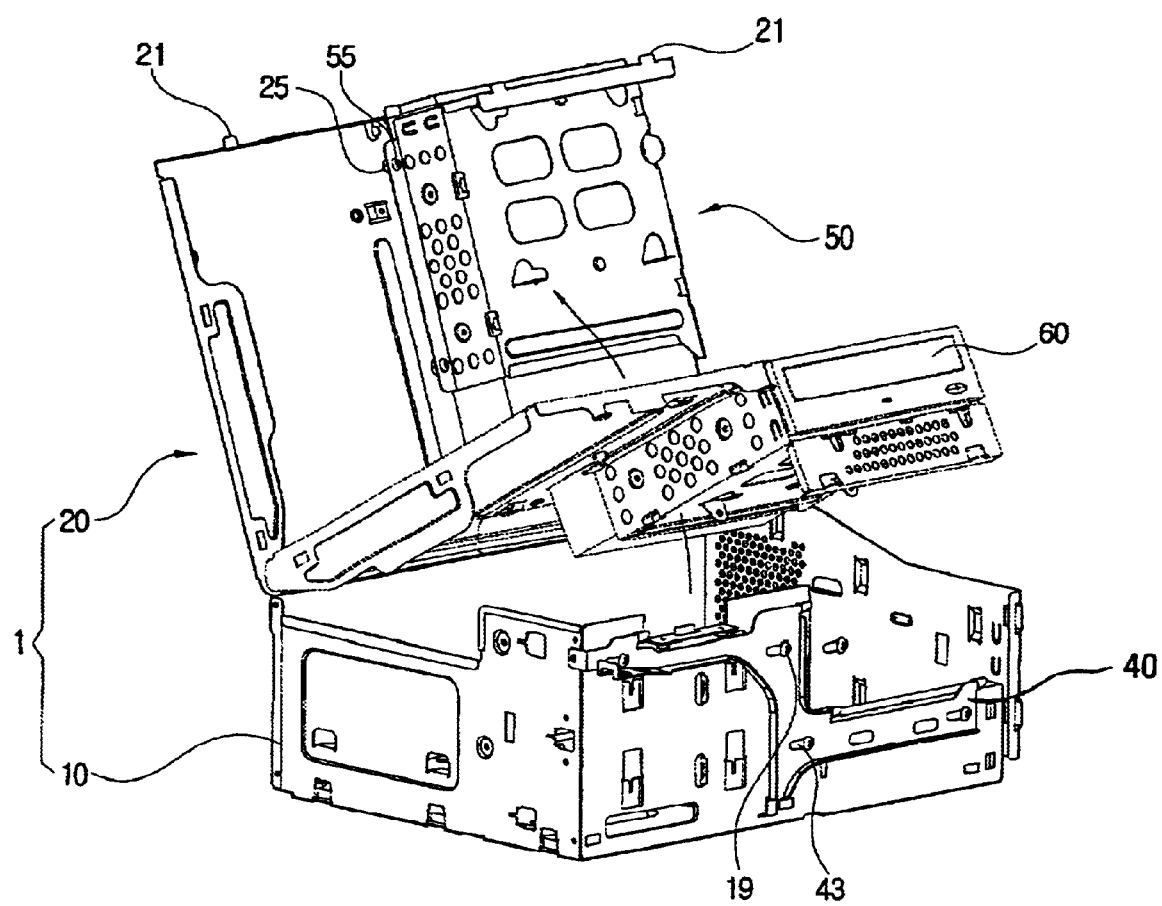
FIG. 6 is a view for illustrating the movement of the fixed casing according to a first embodiment of the present invention.

As shown in FIGS. 3 and 6, the cage 50 accommodates a CD-ROM drive 60. Further, the cage 50 has a flange 54 at its each side. In the flange 54 is formed a plurality of screw holes 53 through which the screws 55 attaching the cage 50 to the movable casing 20 pass. The cage 50 has a plurality of tabs 21c, 21d at the end of the front side. The plurality of tabs 21c, 21d are bent forward, and are similar to the tabs 21a, 21b of the movable casing 20.

Figure 4:
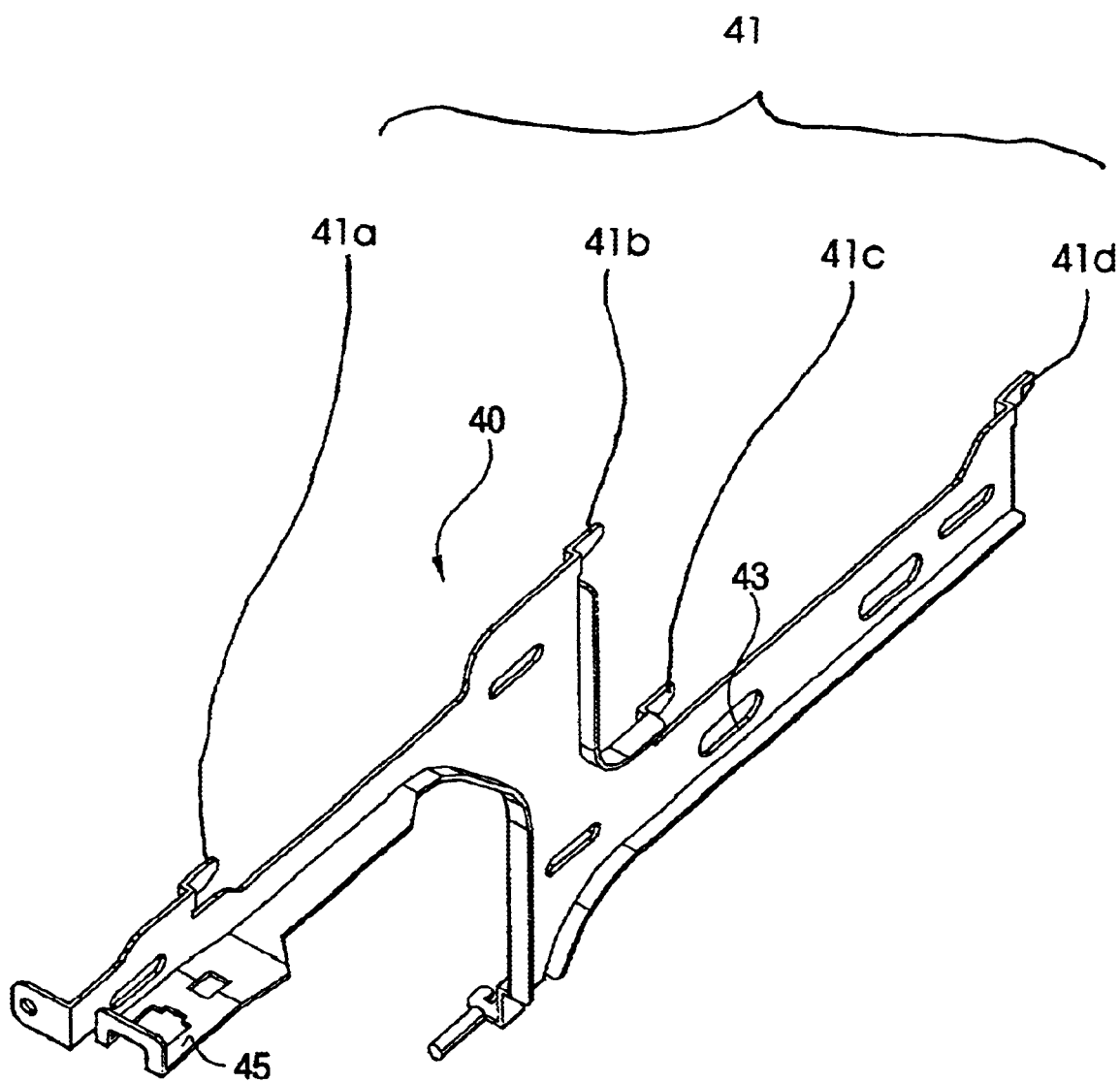
FIG. 4 is a perspective view of a slide constructed according to the principles of the present invention.

As shown in FIG. 4, the slide 40 includes the offsets 41 to be locked and unlocked to the tabs 21 of the movable casing 20 and the cage 50, elongated holes 43 being combined with the bosses 17 of the fixed casing 10 and a grip 45 located at one side of the slide 40.

As shown in FIG. 4, the offsets 41a, 41b, 41c, 41d are locked and released respectively to and from the tabs 21a, 21b, 21c, 21d protruding from the movable casing 20 and the cage 50, so that the movable casing 20 covers and uncovers the fixed casing 10.

Figure 5:
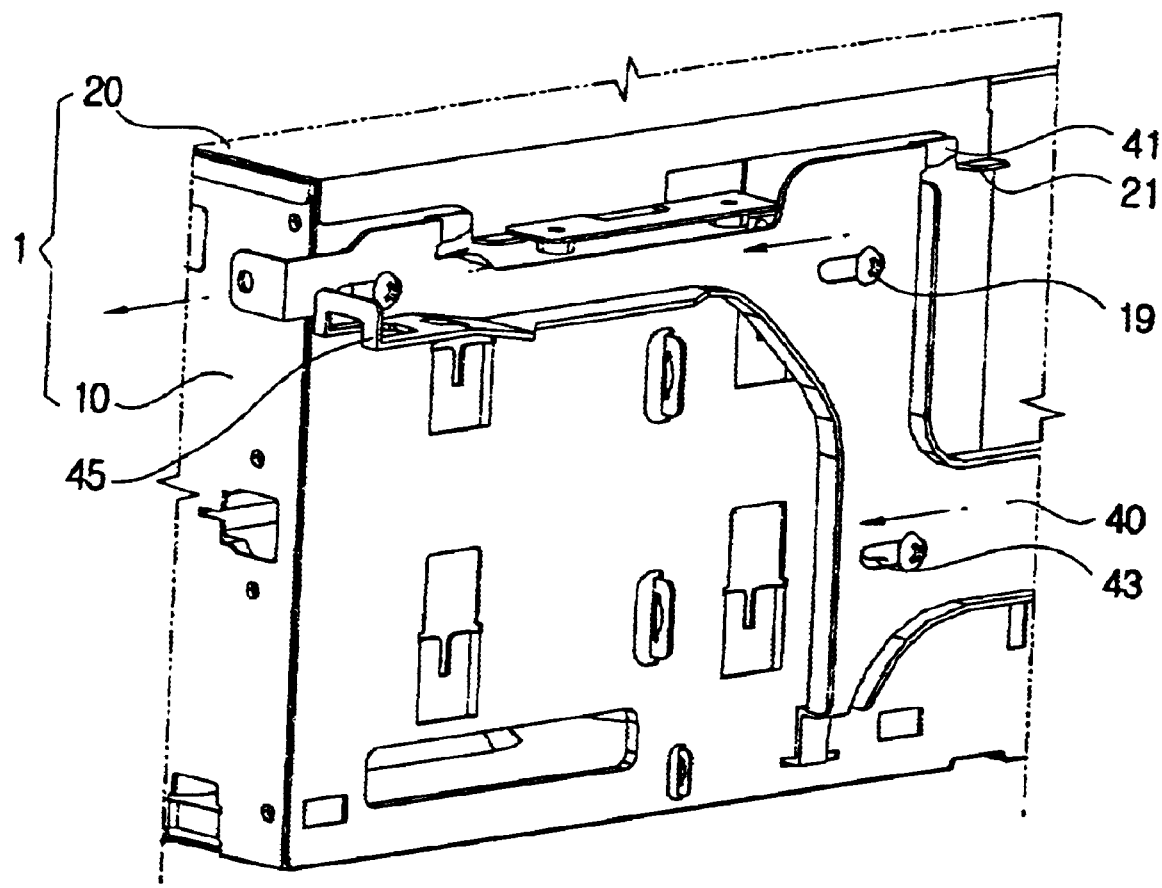
FIG. 5 is a view for illustrating the operating state of the latch according to a first embodiment of the present invention.

Each elongated hole 43 is made by punching out the slide 40 at an area corresponding to each boss 17 of the fixed casing 10. The bosses 17 of the fixed casing 10 are inserted into the elongated holes 43, and then the bosses 17 are screw-coupled with screws 19, so as to hold the slide 40 at the fixed casing 10 (see FIG. 5). Thus, the slide 40 slides along the elongated holes 43, so that the offsets 41 of the slide 40 are locked and released to the tabs 21.

The grip 45 is bent at one side of the slide 40. Thus, when a user pulls the grip 45 laterally, the offsets 41 of the slide 40 are released from the tabs 21.

Figure 7:
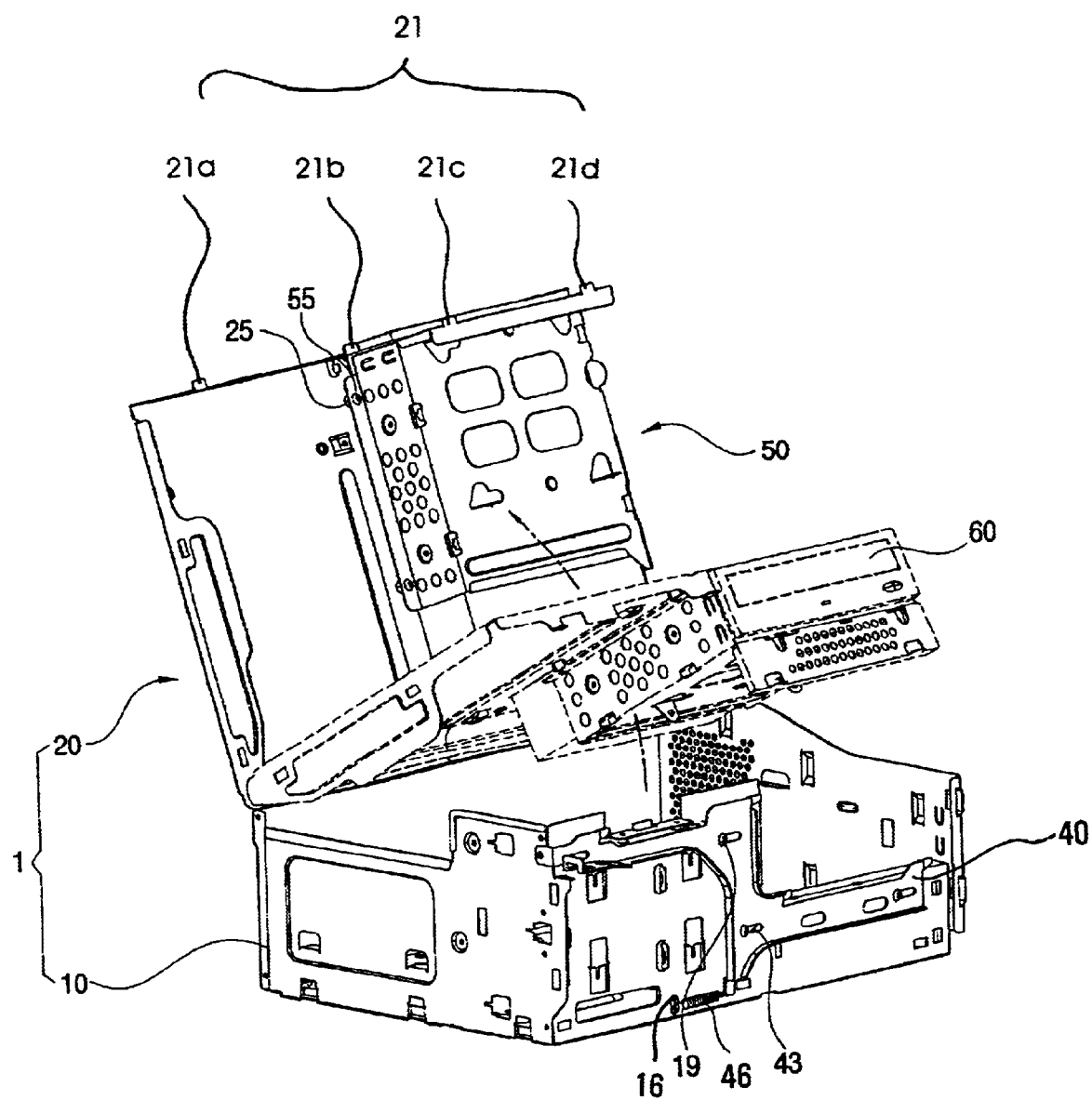
FIG. 7 is a view for illustrating the movement of the fixed casing where a first embodiment of the present invention further comprises a spring.

FIG. 7 shows a movement of the fixed casing where a first embodiment of the present invention further comprises a compression spring 46.

As shown in FIG. 7, the compression spring 46 is connected to the lower position of the slide 40 and a ring 16 protruding from the front of the fixed casing 10. Thus, the compression spring 46 allows the offsets 41 to be elastically locked with the tabs 21, so that the combination of the movable casing 20 and the fixed casing 10 is closed.

With this configuration, the procedure of disassembling the computer according to the present invention will be described herein below.

First, the grip 45 of the slide 40 engaged with the fixed casing 10 is pulled from the locking position to the releasing position. If the computer has a compression spring 46, the grip 45 of the slide 40 is pulled against the spring bias. At this time, the compression spring 46 is shortened, and the offsets 41a, 41b, 41c, 41d of the slide 40 are released respectively from the tabs 21a, 21b, 21c, 21d of the movable casing 20 and the cage 50.

Thereafter, a user can lift up the movable casing 20 around the hinge 30 out of the fixed casing 10. Thus, the movable casing 20 equipped with the computer components such as the CD-ROM drive 60 is rotated upwardly (see FIG. 7). Then, if a user releases the grip 45, the slide 40 returns to the original position by the restoring force of the compression spring 46 connected to the slide 40. Accordingly, a user can easily repair or exchange the components without separating any middle frame and without tools such as a screwdriver.

To completely separate the movable casing 20 from the fixed casing 10, the hinge pin 33 of the hinge 30 at the rear position of the movable casing 20 may be removed from the hinge hole 31. Thus, the movable casing 20 is simply separated from the fixed casing 10.

The procedure of combining the movable casing 20 with the fixed casing 10 is performed in the inverse order to the separating procedure. First, a user pulls the grip 45 of the slide 45 laterally and then covers the fixed casing 10 with the movable casing 20. If a user releases the grip 45, the offsets 41a, 41b, 41c, 41d are positioned above the tabs 21a, 21b, 21c, 21d respectively by the restoring force of the compression spring 46, so that the combination of the movable casing 20 and the fixed casing 10 is closed.

The upper end of the offsets 41 may have a camming surface which is curved. In this casing, a user can cover the fixed casing with the movable casing without pulling the grip. The configuration of the camming surface is such as to allow the downward movement of the movable casing to be changed to the lateral movement of the slide. For example, if the upper end of the offset 41 in FIG. 4 has a camming surface which is declined to the right, the slider 40 slides to the left by the tab's movement along the camming surface of the offset 41 when a user covers the movable casing toward the fixed casing. The slide 40 returns to the original position by the restoring force of the compression spring 46 after the tab 21 is positioned below the offset 41. Thus, the tab 21 is engaged to the offset 41.

Figure 8:
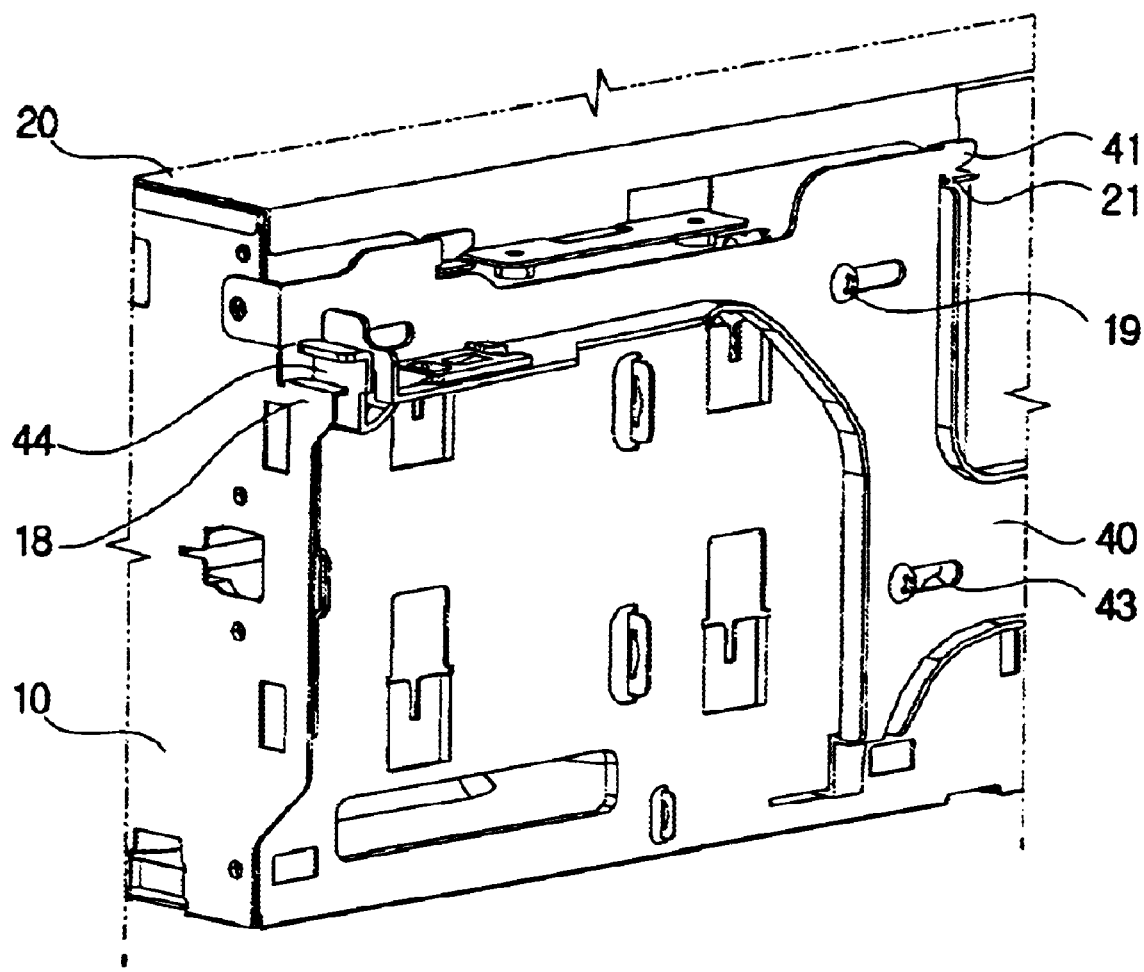
FIGS. 8 and 9 are views for illustrating an operating state of a latch according to a second embodiment of the present invention.

FIG. 8 is an exploded perspective view showing a part of a computer according to a second embodiment of the present invention. The computer substantially has the same configuration that the computer according to the first embodiment of the present invention has, and further comprises a catch 18 provided in the fixed casing 10 and a release lever 44 provided in the slide 40 and blocked with and released from the catch 18 so as to fix the slide 40 employed as a latch.

As shown in FIG. 8, the catch 18 protrudes from the fixed casing 10 as an inverse "L" shape on one side of the slide 40, and interacts with the release lever 44, thereby restricting free movement of the slide 40.

The release lever 44 is preferably made of plastic material having elasticity, and one end of the release lever 44 is fastened to the grip 45 of the slide 40. Thus, a bent free-end of the release lever 44 is caught in the catch 18, thereby prevents the slide 40 from moving from the locking position to the releasing position.

Figure 9:
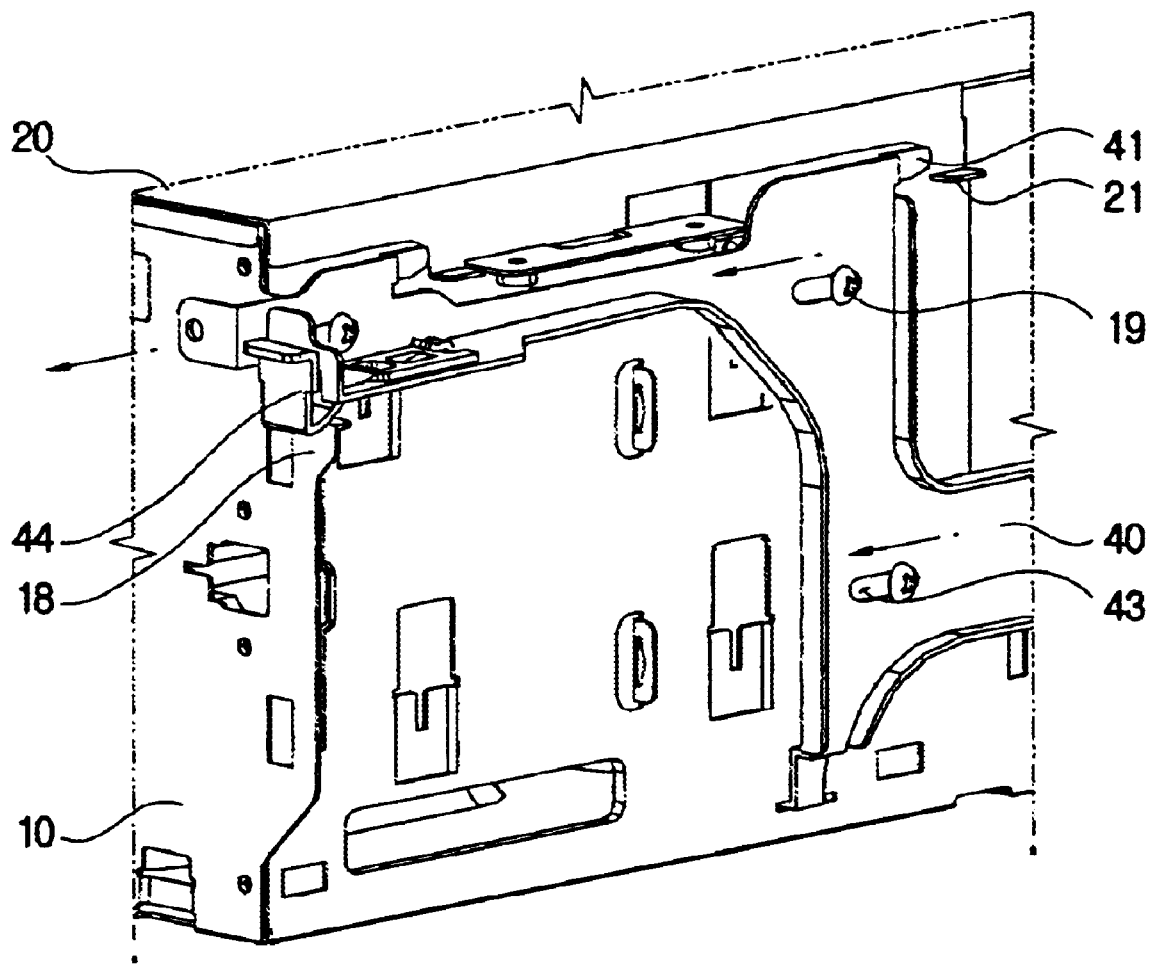

At the locking position of the latch, if a user moves the release lever upwardly, then the release lever 44 is released from the catch 18 (see FIG. 9). Then, if a user moves the grip 45 connected to the release lever 44 from the locking position to the releasing position, then the offsets 41 of the latch are released from the tabs 21, thereby releasing the latch (see FIG. 9). Thus, a user can easily repair and exchange the computer components by lifting up the movable casing 20 around the hinge 30 out of the fixed casing 10. The locking procedure is performed in the inverse order to the releasing procedure.

Figure 10:
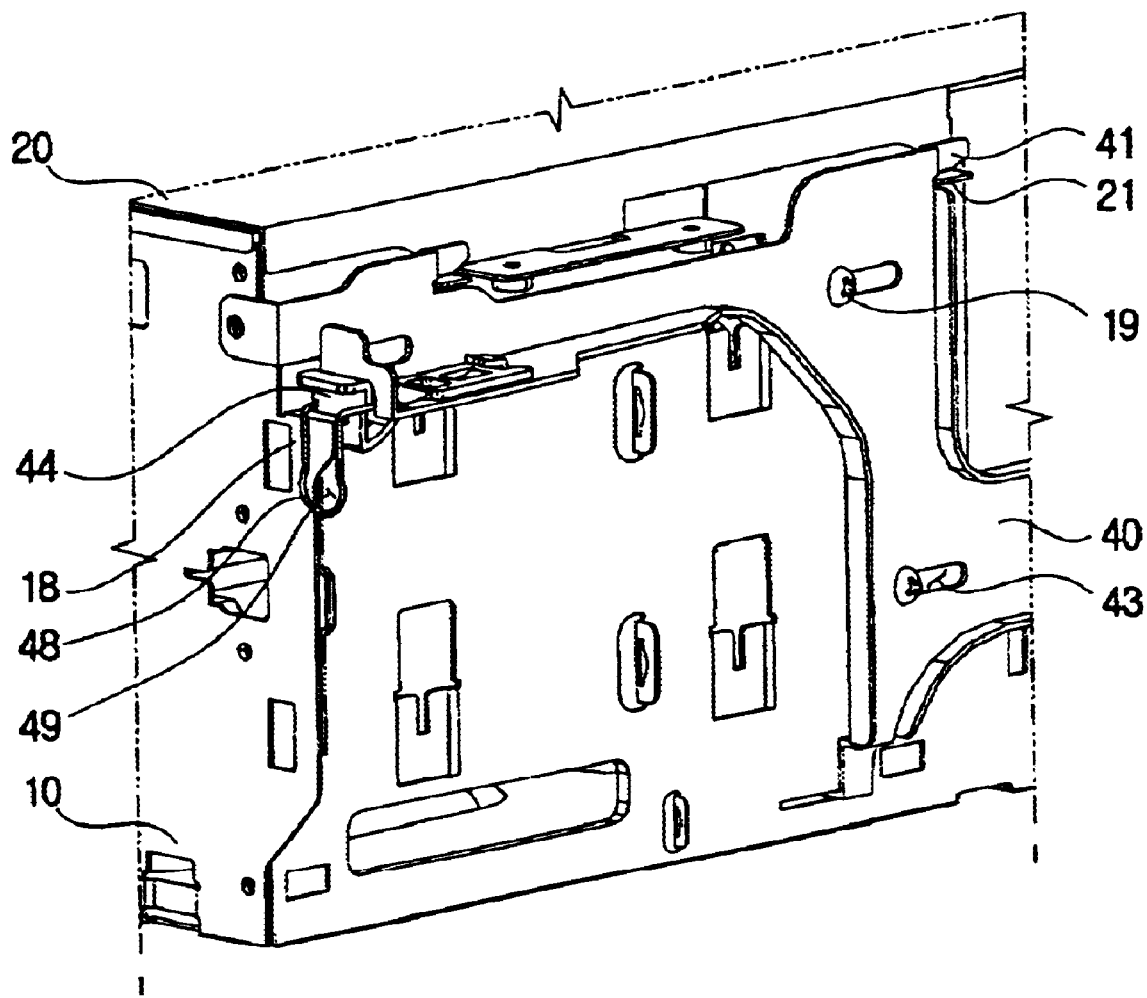
FIGS. 10 and 11 are views for illustrating an operating state of a latch according to a third embodiment of the present invention.

FIG. 10 is an exploded perspective view showing a part of a computer according to a third embodiment of the present invention. The computer has substantially the same configuration that the computer according to the second embodiment shown in FIG. 8 has, and further comprises a clasp 48 for pulling the slide 40 to the releasing position conveniently.

Figure 11:
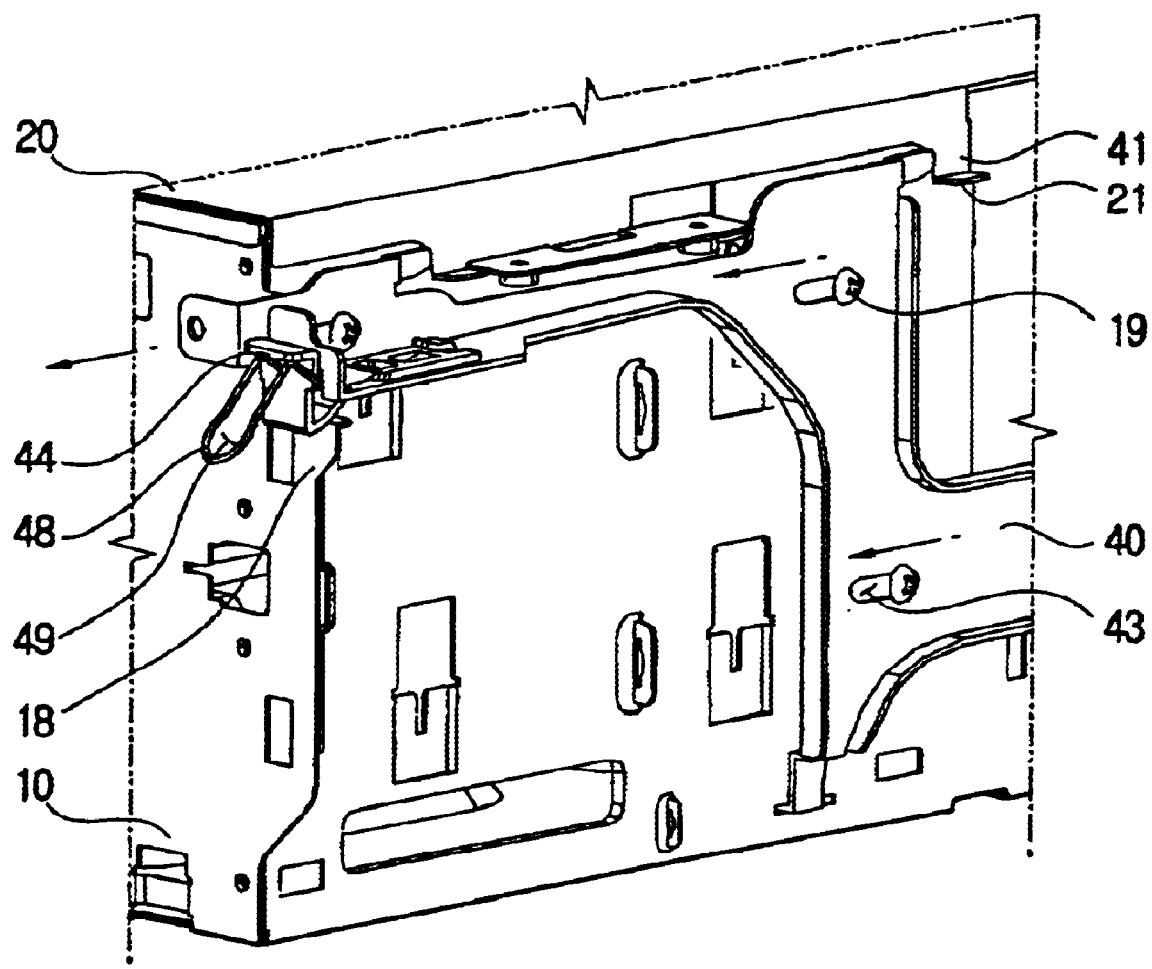

As shown in FIG. 10, the clasp 48 has a finger hole 49, which is bent as an inverse "L" shape and combined to the grip 45 of the slide 40 while the release lever 44 is being between the grip 45 and the clasp 48. Thus, if a user puts his or her finger in the finger hole 49 of the clasp 48 at the locking position of the latch, and rotates the clasp 48 upwardly, then a bent upper-part of the clasp 48 pushes a protruded part of the release lever 44 upwardly. Then, the release lever 44 moves upwardly, and is released from the catch 18 (see FIG. 11). Thus, a user can easily release the latch by rotating the clasp 48 in the releasing direction. Such a clasp 48 having a finger hole 49 facilitates releasing the slide 40.

Figure 12:
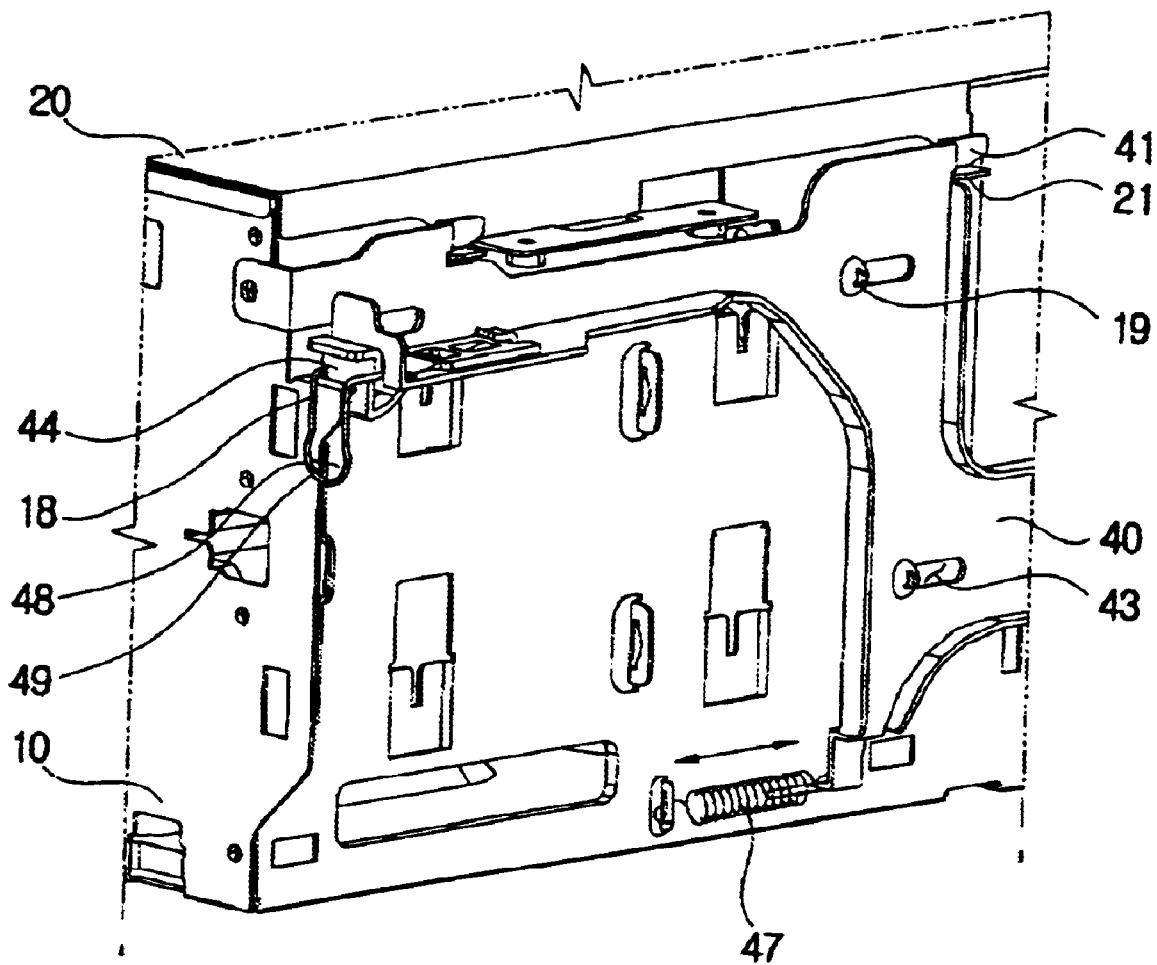
FIGS. 12 and 13 are views for illustrating an operating state of a latch according to a fourth embodiment of the present invention.

FIG. 12 is an exploded perspective view showing a part of a computer according to a fourth embodiment of the present invention. The computer has substantially the same configuration that the computer according to the third embodiment shown in FIG. 10 has, and further comprises a coil spring 47 returning the slide 40 to the releasing position.

Figure 13:
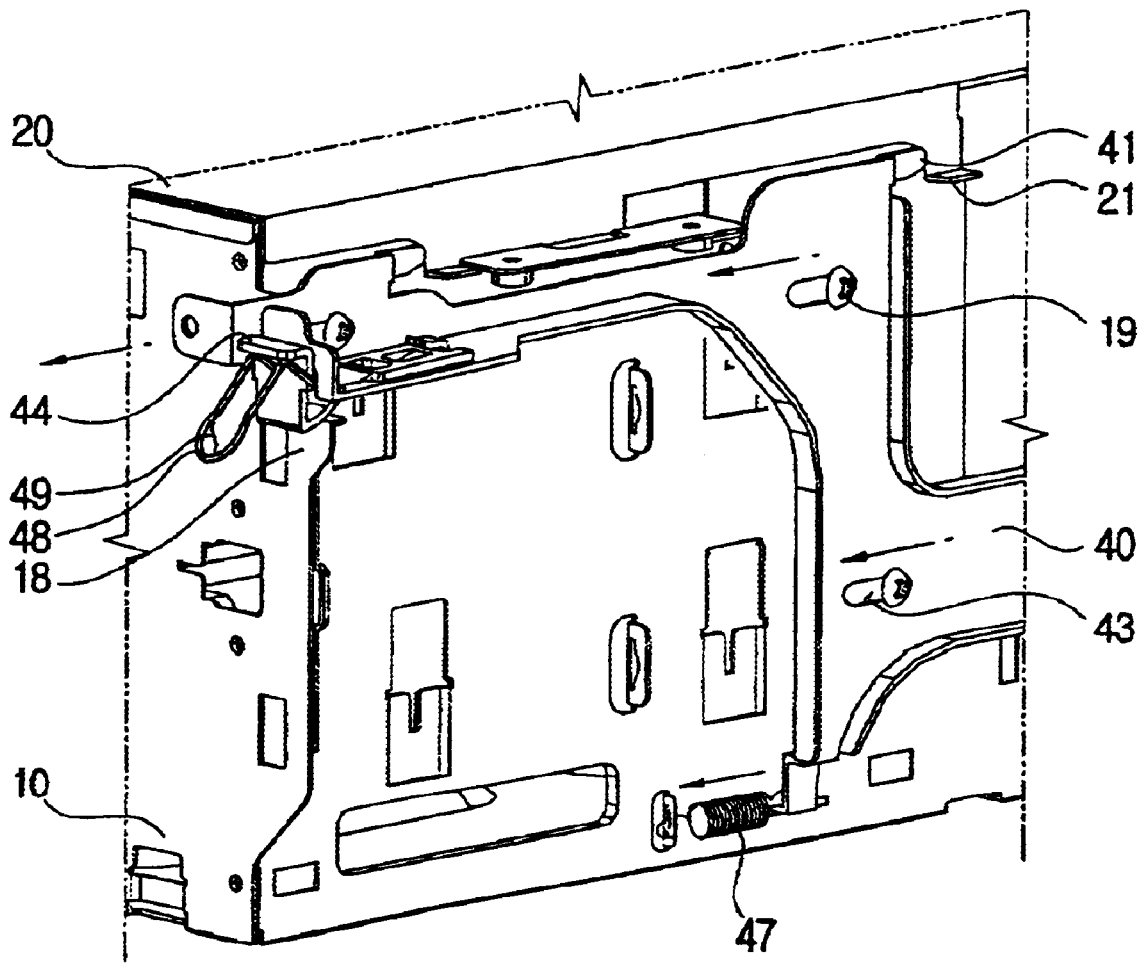

As shown in FIG. 12, the coil spring 47 is provided at a lower part of the slide 40, and has a first end coupled to the fixed casing 10 and a second end coupled to the slide 40. The coil spring 47 is being elastically lengthened at the locking position of the latch. However, the coil spring 47 is elastically shortened by means of a restoring force when the release lever 44 is released from the catch 18, so that the slide 40 is moved from the locking position to the releasing position (see FIG. 13).

Thus, in the fourth embodiment according to the present invention, if a user puts his or her finger in the finger hole 49 of the clasp 48, and rotates the clasp 48 upwardly, then a bent upper-part of the clasp 48 pushes a protruded part of the release lever 44 upwardly. Then, the release lever 44 moves upwardly, and is released from the catch 18. At this time, the coil spring, which is being elastically lengthened at the locking position of the slide 40, is elastically shortened, so that the slide 40 is automatically moved from the locking position to the releasing position (see FIG. 13). Then, according as the offsets 41 of the latch are released from the tabs 21, the movable casing 20 is separated from the fixed casing 10. Such a coil spring having a restoring force facilitates returning the slide 40 to the releasing position.

Figure 14:
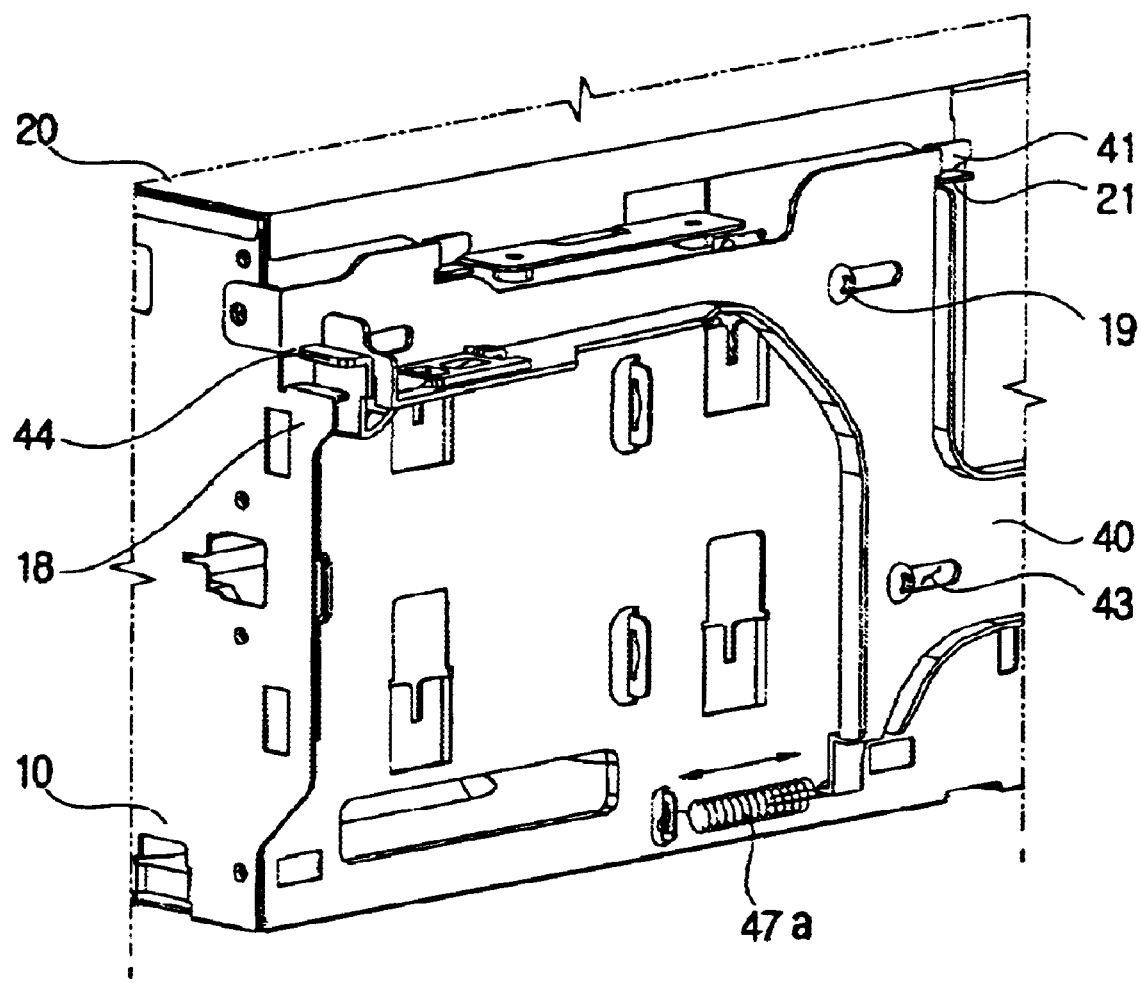
FIGS. 14 and 15 are views for illustrating an operating state of a latch according to a fifth embodiment of the present invention.
Figure 15:
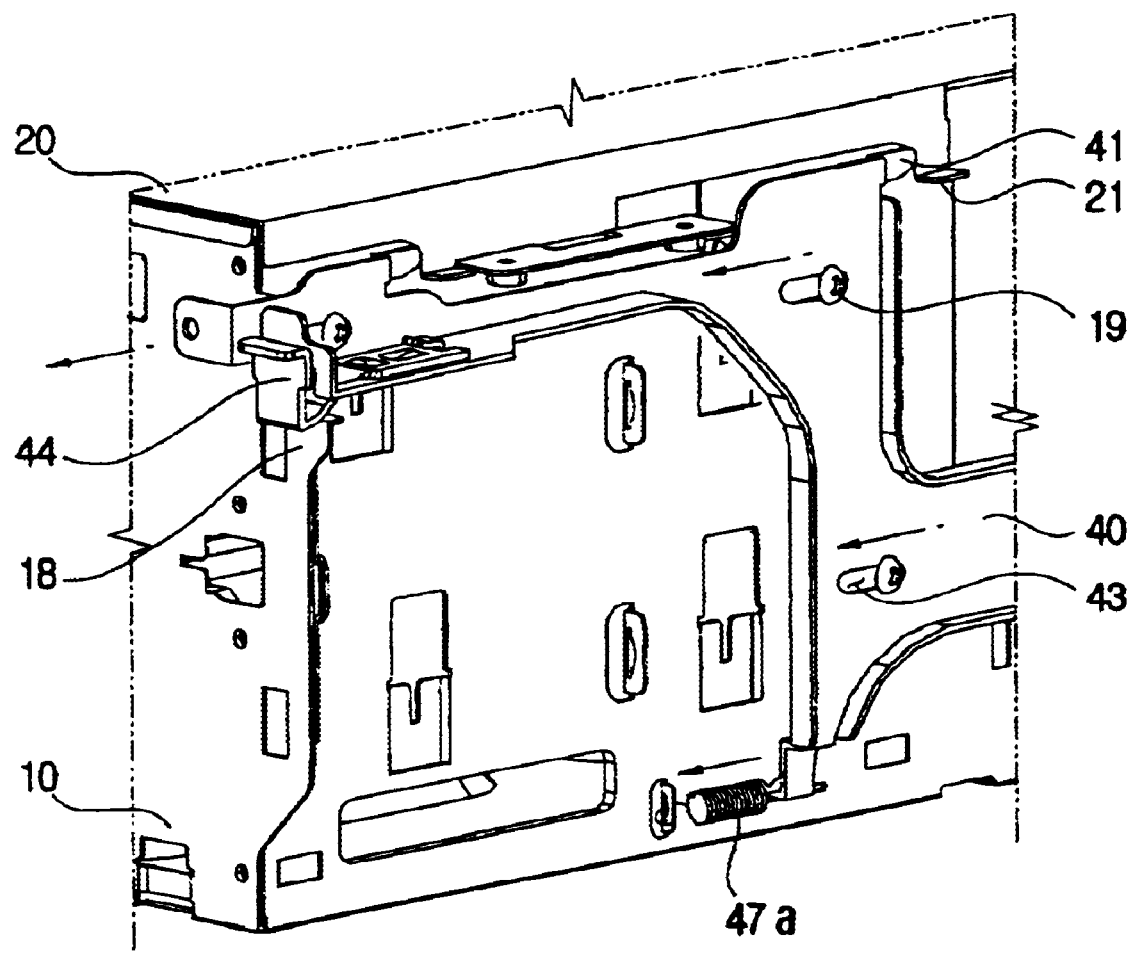

FIGS. 14 and 15 are an exploded perspective view showing a part of a computer according to a fifth embodiment of the present invention. The computer has substantially the same configuration that the computer according to the second embodiment has, and further comprises a coil spring 47a returning the slide 40 to the releasing position.

As shown in FIGS. 14 and 15, the coil spring 47a is provided at a lower part of the slide 40, and has a first end coupled to the fixed casing 10 and a second end coupled to the slide 40. The coil spring 47a is being elastically lengthened at the locking position of the latch (see FIG. 14). However, the coil spring 47a is elastically shortened by means of a restoring force when the release lever 44 is released from the catch 18, so that the slide 40 is moved from the locking position to the releasing position (see FIG. 15).

Thus, in the fifth embodiment according to the present invention, if a user moves the release lever 44 upwardly at the locking position of the slide 40, then the release lever 44 is released from the catch 18. At this time, the coil spring, which is being elastically lengthened at the locking position of the slide 40, is elastically shortened, so that the slide 40 is automatically moved from the locking position to the releasing position (see FIG. 15). Then, according as the offsets 41 of the slide 40 are released from the tabs 21, the movable casing 20 is separated from the fixed casing 10. Thus, a user can easily exchange and repair the computer components.

In the above-description, the slide 40 is combined with the fixed casing 10. However, the slide 40 may be combined with the movable casing 20. In this case, the tabs 21 to be engaged with the offsets 41 of the slide 40 are positioned at the fixed casing 10.

In the above-description, the CD-ROM drive 60 is mounted on the movable casing 20 by using the cage 50. However, various kinds of computer components such as a floppy disk drive (not shown) and a hard disk drive may be also accommodated in the cage 50, and then mounted on the movable casing 20.

In the above-description, the release lever 44 can be elastically deformed in order to release the release lever 44 from the catch 18. However, the catch 18 may be elastically deformed in order to release the release lever 44 from the catch 18.

As described above, by means of the movable casing 20 equipped with computer components, the fixed casing 10 combining with the movable casing 20, and the latch closing and opening the combination of the fixed casing and movable casing, a desktop computer according to the present invention is simply assembled and disassembled, so that a user can easily repair and exchange computer components.

Although the preferred embodiments of the present invention have been disclosed for an illustrative purpose, those skilled in the art will appreciate that various modifications, additions and substitutions are possible, without departing from the scope and spirit of the invention as disclosed in the accompanying claims.

What is claimed is:

1. A computer, comprising:
   a fixed casing accommodating a first computer component and having an opening;
   a movable casing covering said opening of said fixed casing, said movable casing having a tab protruding from said movable casing, said movable casing accommodating a second computer component on an inner surface of said movable casing;
   a pair of hinges rotatably coupling said fixed casing to said movable casing so as to allow the movable casing to cover and uncover said opening; and
   a latch comprising a slide mounted on said fixed casing, said slide having an offset corresponding to said tab, said slide moving laterally so as to engage said tab to said offset where said movable casing covers said opening and to disengage said tab from said offset where said movable casing uncovers said opening.

2. The computer of claim 1, said slide having an elongated hole, said fixed casing having a boss corresponding to said elongated hole, said boss being inserted into said elongated hole and guiding the sliding of said slide along said elongated hole.

3. The computer of claim 2, said slide further comprising a grip.

4. The computer of claim 3, further comprising a spring having a first end connected to said slide and a second end connected to said fixed casing, said spring biasing said latch to engage said tab to said offset.

5. The computer of claim 4, said offset having a camming surface on its upper end so as to allow the downward movement of said movable casing to be changed to the lateral movement of said slide.

6. The computer of claim 5, said second component comprising a CD-ROM drive.

7. The computer of claim 2, further comprising:
   a catch positioned at said fixed casing; and
   a release lever positioned at a location of said slide corresponding to said catch, said release lever caught and released by said catch, one of said catch and said release lever being able to be elastically deformed against the other.

8. The computer of claim 7, further comprising a spring having a first end connected to said slide and a second end connected to said fixed casing, said spring biasing said latch to be elastically released from said fixed casing.

9. The computer of claim 7, further comprising a clasp located at a position adjacent to said release lever, said clasp applying pressure to said release lever by a rotation of said clasp so as to release said release lever from said catch.

10. The computer of claim 9, further comprising a spring having a first end connected to said slide and a second end connected to said fixed casing, said spring biasing said latch to be elastically released from said fixed casing.

11. The computer of claim 9, said clasp having a finger hole.

12. The computer of claim 11, further comprising a spring having a first end connected to said slide and a second end connected to said fixed casing, said spring biasing said latch to be elastically released from said fixed casing.

13. A computer, comprising:
   a fixed casing accommodating a first computer component and having an opening;
   a movable casing covering at least a part of said opening of said fixed casing, said movable casing having a plurality of tabs protruding from said movable casing, said movable casing accommodating a second computer component on an inner surface of said movable casing;
   a pair of hinges rotatably coupling said fixed casing to said movable casing so as to allow the movable casing to cover and uncover said opening; and
   a latch comprising a slide mounted on said fixed casing, said slide having a plurality of offsets corresponding to said plurality of tabs, said slide moving laterally so as to engage said plurality of tabs to said plurality of offsets where said movable casing covers said opening and to disengage said tab from said offset where said movable casing uncovers said opening, said first component and said second component being accessible for repairing or removing said first component and said second component where said movable casing uncovers said opening, said first component being not accessible for repairing or removing said first component and said second component where said movable casing covers said opening, said plurality of offsets engaged to or disengaged from said plurality of tabs at a time by sliding said slide.

14. The computer of claim 13, further comprising:

a catch positioned at said fixed casing; and a release lever positioned at a location of said slide corresponding to said catch, said release lever caught and released by said catch, one of said catch and said release lever being able to be elastically deformed against the other.

15. The computer of claim 14, further comprising a clasp located at a position adjacent to said release lever, said clasp applying pressure to said release lever by a rotation of said clasp so as to release said release lever from said catch.

16. The computer of claim 15, said clasp having a finger hole.

17. The computer of claim 16, farther comprising:

a spring having a first end connected to said slide and a second end connected to said fixed casing, said spring biasing said latch to be elastically released from said fixed casing.

18. A computer, comprising:

a fixed casing accommodating a first computer component and having an opening, said fixed casing having a catch and a boss;

a movable casing covering at least a part of said opening of said fixed casing, said movable casing having at least one first tab protruding from said movable casing;

a pair of hinges rotatably coupling said fixed casing to said movable casing so as to allow the movable casing to cover and uncover said opening;

a cage mounted on an inner surface of said movable casing, said cage accommodating a second computer component;

a latch comprising a slide, said slide mounted on said fixed casing, said slide comprising:

at least one first offset corresponding to said first tab, said first offset engaged to said first tab where said opening is covered with said movable casing, said first offset disengaged from said first tab where said opening is not covered with said movable casing;

a release lever, said release lever caught and released by said catch;

a clasp having a finger hole, said clasp located at a position adjacent to said release lever, said clasp applying pressure to said release lever by a rotation of said clasp so as to release said release lever from said catch; and an elongated hole corresponding to said boss, said boss being inserted into said elongated hole and guiding the sliding of said slide along said elongated hole;

a spring having a first end connected to said slide and a second end connected to said fixed casing, said spring biasing said latch to be elastically released from said fixed casing.

19. The computer of claim 18, said second component comprising a CD-ROM drive.

20. The computer of claim 19, further comprising:

at least one second tab protruding from said cage; and at least one second offset corresponding to said cage and protruding from said slide, said first and second offsets engaged to said first and second tabs respectively where said movable casing covers said opening.

* * * * *